United States Patent
Saito

(10) Patent No.: US 10,951,868 B2
(45) Date of Patent: Mar. 16, 2021

(54) IRRADIATION APPARATUS WITH ANGLE DETECTION UNIT

(71) Applicant: Stanley Electric Co., Ltd., Tokyo (JP)

(72) Inventor: Takao Saito, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/514,517

(22) Filed: Jul. 17, 2019

(65) Prior Publication Data

US 2020/0026070 A1  Jan. 23, 2020

(30) Foreign Application Priority Data

Jul. 20, 2018 (JP) .............................. JP2018-137077

(51) Int. Cl.
| | |
|---|---|
| *H04N 9/31* | (2006.01) |
| *G02B 26/10* | (2006.01) |
| *G09G 3/02* | (2006.01) |

(52) U.S. Cl.
CPC ......... *H04N 9/3129* (2013.01); *G02B 26/101* (2013.01); *G09G 3/025* (2013.01)

(58) Field of Classification Search
CPC ..... H04N 9/3129; G02B 26/101; G09G 3/025
See application file for complete search history.

(56) References Cited

U.S. PATENT DOCUMENTS

| | | | | |
|---|---|---|---|---|
| 7,393,107 | B2 * | 7/2008 | Yonekubo | G03B 21/2086 348/818 |
| 7,419,266 | B2 * | 9/2008 | Seki | G03B 21/2086 348/818 |
| 8,067,725 | B2 * | 11/2011 | Nishioka | H04N 9/3164 250/205 |
| 8,157,387 | B2 * | 4/2012 | Yonekubo | G03B 21/2086 353/74 |
| 8,197,066 | B2 * | 6/2012 | Nagashima | H04N 9/3155 353/10 |
| 8,259,237 | B2 * | 9/2012 | Nishioka | G09G 3/02 348/744 |
| 8,519,324 | B2 * | 8/2013 | Tsuida | B41J 2/471 250/221 |
| 8,643,926 | B2 * | 2/2014 | Wakabayashi | G02B 26/101 359/224.1 |

(Continued)

FOREIGN PATENT DOCUMENTS

| | | |
|---|---|---|
| JP | 4419255 B2 | 12/2009 |
| JP | 4647240 B2 | 12/2010 |

*Primary Examiner* — Bao-Luan Q Le
(74) *Attorney, Agent, or Firm* — Kenealy Vaidya LLP

(57) ABSTRACT

In an MEMS projector (10), an image signal processing unit (110) outputs an inspection signal, and an inspection signal processing unit (114) outputs a light emission instruction signal. An inspection light source drive unit (112) outputs a light emission signal, and an inspection light source (13) radiates an inspection light. The inspection light radiated from the inspection light source (13) is reflected at the reflection position RP of a first support portion (22), and then received by a light receiver (14). Then, the light receiver (14) outputs a received light signal. Based on the received light signal, the inspection signal processing unit (114) detects the angle of the light deflecting mirror (20) around the X axial line.

20 Claims, 6 Drawing Sheets

(56) References Cited

U.S. PATENT DOCUMENTS

| | | | | |
|---|---|---|---|---|
| 8,654,415 B2* | 2/2014 | Shimizu | G02B 26/101 | 358/475 |
| 8,665,501 B2* | 3/2014 | Shimizu | G02B 26/101 | 358/475 |
| 9,075,246 B2* | 7/2015 | Chikaoka | G02B 26/101 | |
| 2005/0007562 A1* | 1/2005 | Seki | G03B 21/2086 | 353/98 |
| 2006/0244925 A1* | 11/2006 | Seki | H04N 3/08 | 353/52 |
| 2007/0012875 A1* | 1/2007 | Miyazawa | H04N 9/3129 | 250/234 |
| 2008/0297868 A1* | 12/2008 | Mizumoto | G02B 26/101 | 359/199.1 |
| 2009/0033884 A1* | 2/2009 | Yonekubo | G03B 21/2086 | 353/85 |
| 2009/0128717 A1* | 5/2009 | Nagashima | H04N 9/3155 | 348/756 |
| 2009/0195644 A1* | 8/2009 | Wakabayashi | G02B 26/101 | 348/51 |
| 2009/0244673 A1* | 10/2009 | Takemoto | G02B 26/085 | 359/208.1 |
| 2009/0316243 A1* | 12/2009 | Tsuida | B41J 2/471 | 359/202.1 |
| 2010/0002152 A1* | 1/2010 | Nishioka | H04N 9/3129 | 348/744 |
| 2010/0006741 A1* | 1/2010 | Nishioka | H04N 9/3129 | 250/201.1 |
| 2011/0128602 A1* | 6/2011 | Hamano | G02B 26/0841 | 359/205.1 |
| 2011/0249312 A1* | 10/2011 | Ishida | G02B 26/085 | 359/202.1 |
| 2011/0279879 A1* | 11/2011 | Wakabayashi | G02B 26/101 | 359/197.1 |
| 2011/0286050 A1* | 11/2011 | Wakabayashi | G02B 26/105 | 358/474 |
| 2012/0313850 A1* | 12/2012 | Ishida | G09G 3/025 | 345/156 |
| 2012/0313909 A1* | 12/2012 | Ishida | G02B 27/0101 | 345/207 |

* cited by examiner

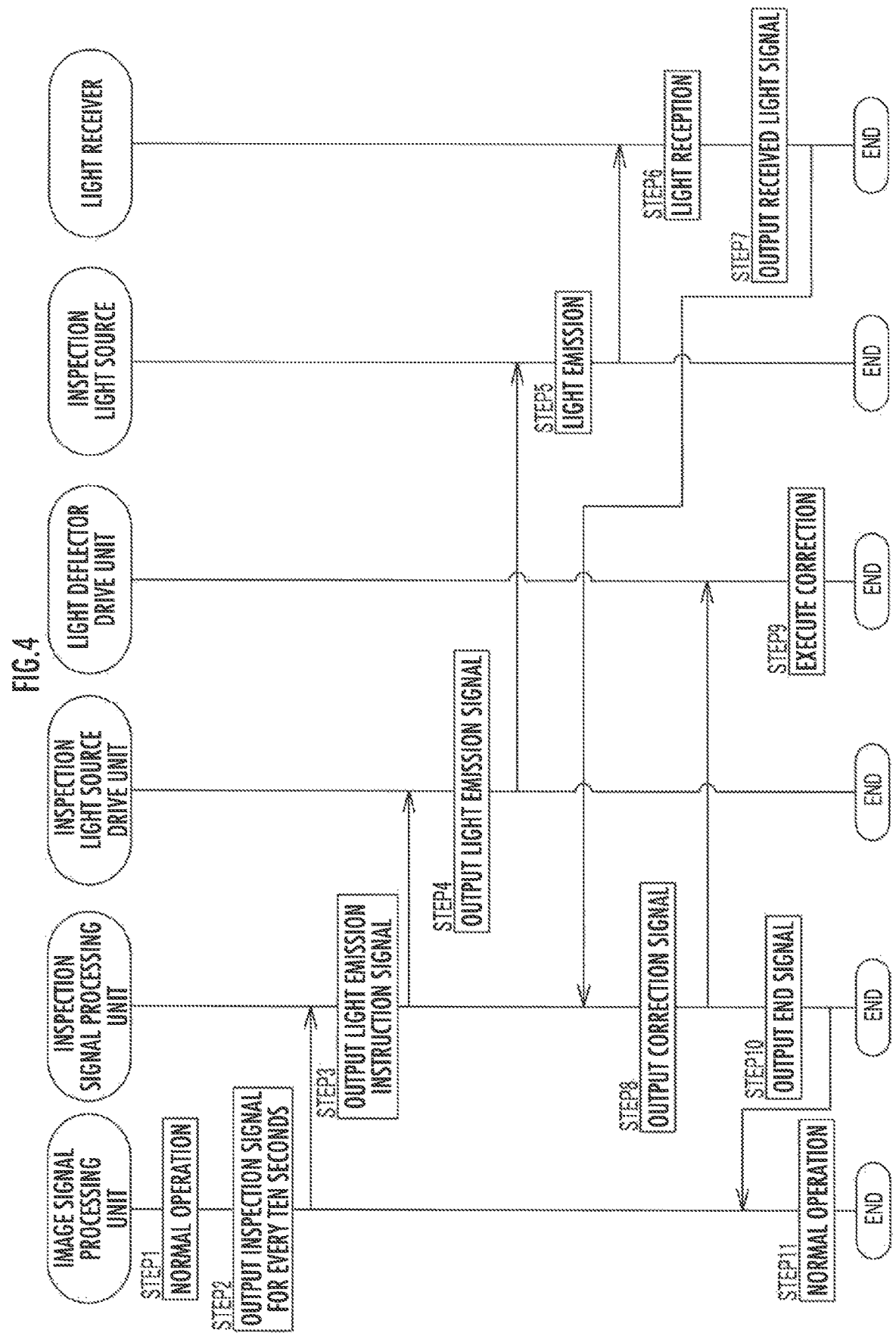

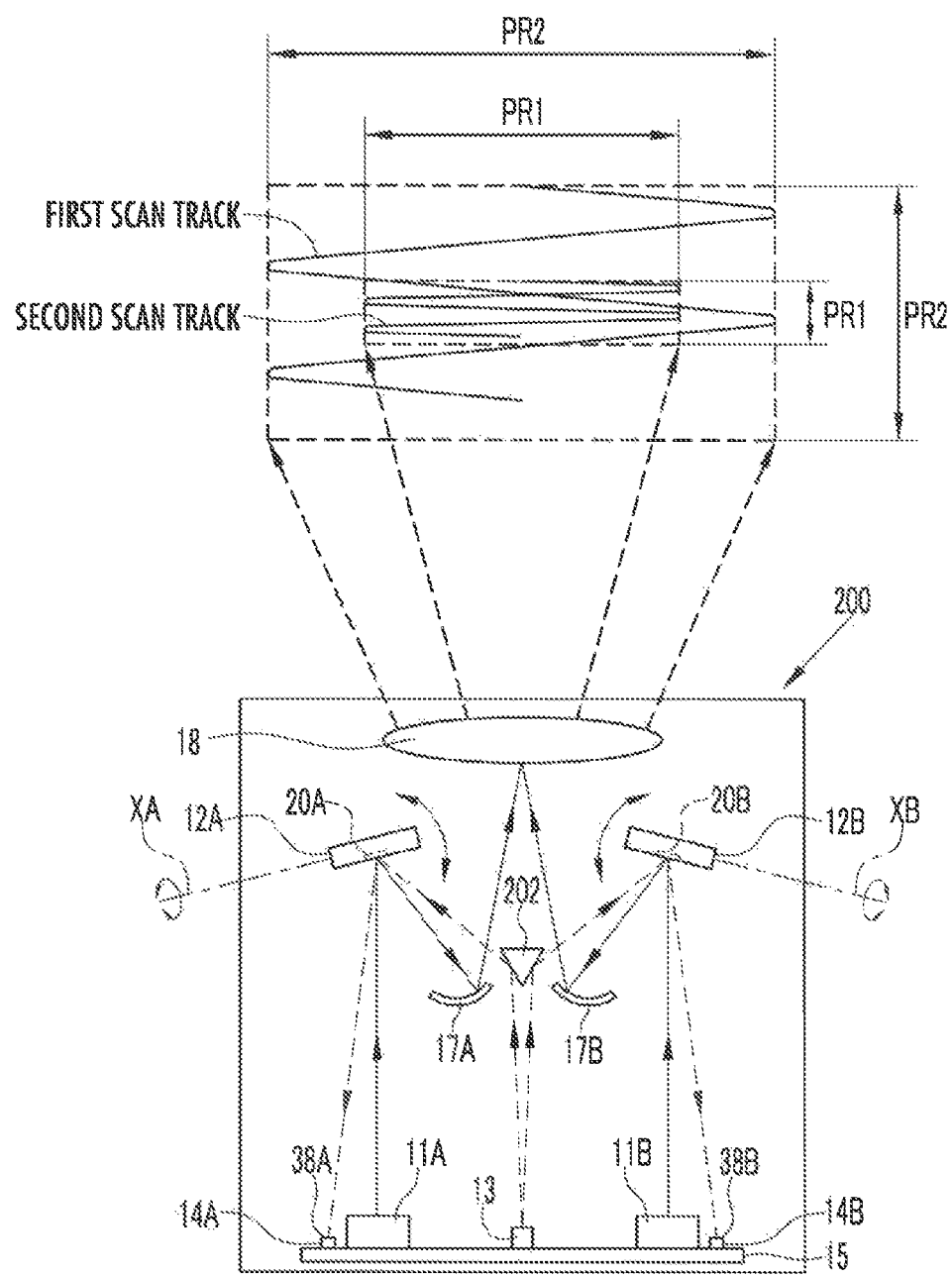

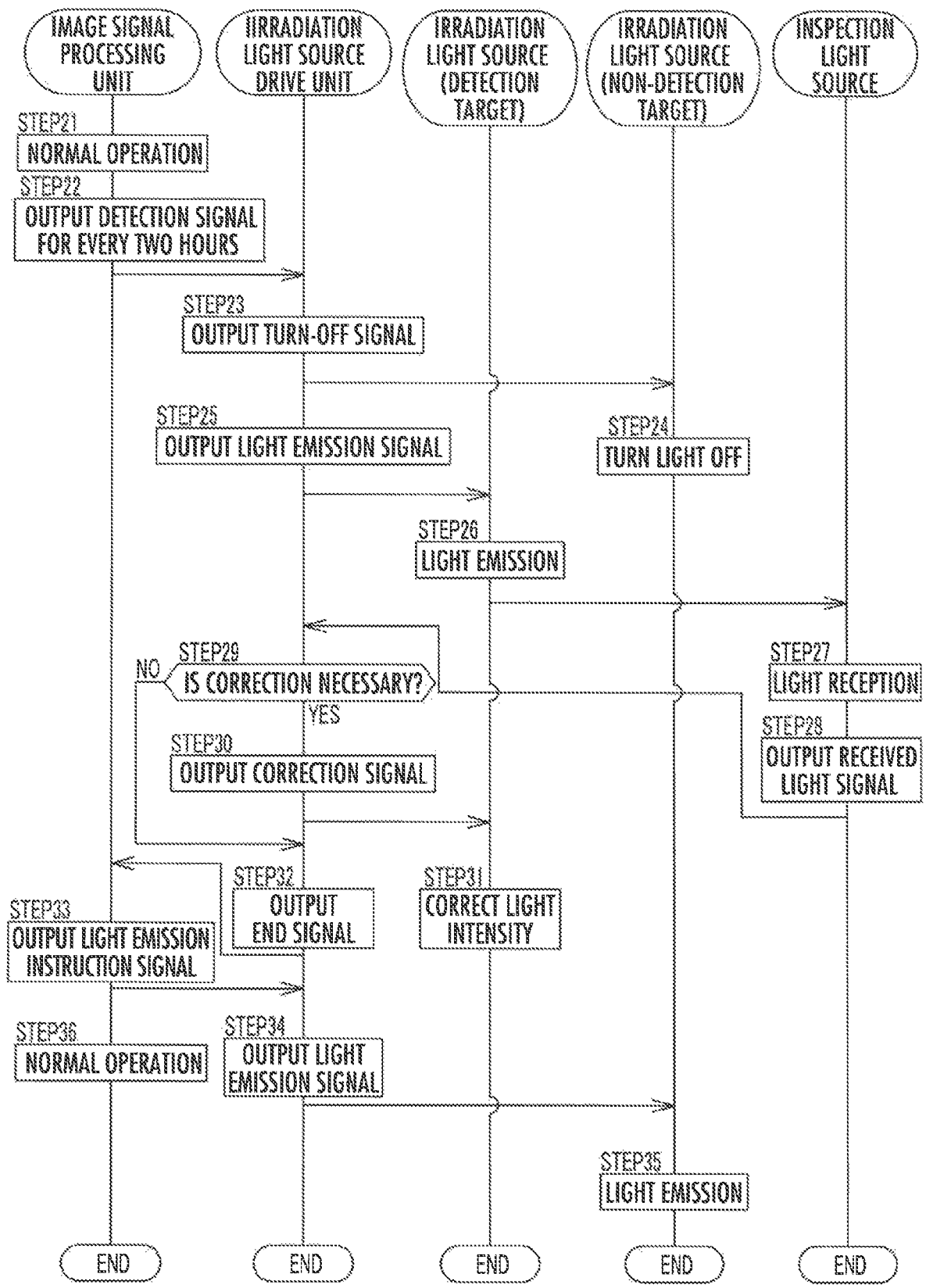

IRRADIATION APPARATUS WITH ANGLE DETECTION UNIT

BACKGROUND OF THE INVENTION

1. Field of the Invention

The present invention relates to an irradiation apparatus having a light deflecting mirror.

2. Description of the Related Art

Currently, there is known an irradiation apparatus including an Micro Electro Mechanical Systems (MEMS) light deflector that scans the light by changing the reflection direction of the light by rotating a light deflecting mirror that reflects light from a light source, such as a laser. Further, an angle detection apparatus that detects the rotation angle of a light deflecting mirror is known (refer to Patent Literature 1 and Patent Literature 2, for example).

The angle detection apparatus (a planar-type actuator) disclosed in Patent Literature 1 includes a light emitting unit that radiates a detection light and a light receiving unit (a light detection means) that receives the detection light, and detects the state of rotation of the light deflecting mirror (a movable panel), based on change in the intensity of the light received by the light receiving unit.

The angle detection apparatus (a resonance-type optical scanner) disclosed in Patent Literature 2 has a light deflecting mirror (a reflection surface) having a through hole, and a light receiving element receives the light having passed through the through hole to detect the rotation angle of the light deflecting mirror, based on the light receiving condition.

CITATION LIST

Patent Literatures

Patent Literature 1: Japanese Patent No. 4647240
Patent Literature 2: Japanese Patent No. 4419255

SUMMARY OF THE INVENTION

According to the angle detection apparatus disclosed in Patent Literature 1, however, when the light deflecting mirror successively rotates, the light deflecting mirror blocks the detection light. This raises a problem in that detection of a rotation angle is not possible when the light deflecting mirror stays still on a slant, though it is possible to detect that the light deflecting mirror is rotating.

According to the angle detection apparatus disclosed in Patent Literature 2, the light cannot be reflected on a part corresponding to the through hole on the light deflecting mirror, which makes the reflected light darker. Moreover, a process of forming a through hole is necessary, which increases the cost.

The present invention has been conceived in view of the above, and aims to provide a low-cost irradiation apparatus capable of reliable detection of the rotation angle of a light deflecting mirror.

According to one aspect of the present invention, there is provided an irradiation apparatus including a first light source which radiates a first light; a light deflector including a light deflecting mirror which reflects the first light radiated from the first light source, a support portion which supports the light deflecting mirror and is rotatable around a first axial line, and a rotation portion which rotates the light deflecting mirror around a second axial line which is orthogonal to the first axial line, the light deflector being configured to scan the first light by changing the reflection direction of the first light into which the first light is reflected by the light reflecting mirror, the reflection direction being changed by rotating the support portion to thereby rotate the light deflecting mirror around the first axial line and also by rotating the light reflecting mirror around the second axial line by the rotation portion; a second light source which radiates a second light; a light receiver which receives the second light radiated from the second light source and reflected by the support portion of the light deflector; and an angle detection unit which detects the rotation angle of the light deflecting mirror around the first axial line, based on the second light received by the light receiver.

In the case that the support portion rotates and the light deflecting mirror is thereby rotated, the reflection direction of the second light reflected by the support portion is changed. That is, the reflection direction of the second light changes in conjunction with the rotation angle of the light deflecting mirror.

According to the present invention, as the rotation angle of the light deflecting mirror is detected based on the second light whose reflection direction is changed when the light deflecting mirror is rotated, it is possible to reliably detect the rotation angle of the light deflecting mirror even when the light deflecting mirror stops to stay still on the way. Further, it is possible to detect the rotation angle of the light deflecting mirror around the first axial line, the light deflecting mirror being capable of rotation in two directions.

Preferably, the light receiver may include a plurality of light receiving elements disposed in an array, the light receiver being configured to detect the reflection angle of the second light, based on which of the plurality of light receiving elements has received the second light, and the angle detection unit may detect the rotation angle of the light deflecting mirror, based on the reflection angle of the second light, the reflection angle being detected by the light receiver.

With this exemplary structure, as the rotation angle of the light deflecting mirror is detected based on the detected reflection angle of the second light, it is possible to readily detect the rotation angle of the light deflecting mirror with a simple structure.

Preferably, the light receiver may detect the light intensity distribution of the second light received, and the angle detection unit may detect the rotation angle of the light deflecting mirror, based on the light intensity distribution of the second light, the light intensity distribution being detected by the light receiver.

With this exemplary structure, as the rotation angle of the light deflecting mirror is detected based on the detected light intensity distribution of the second light, it is possible to readily detect the rotation angle of the light deflecting mirror with a simple structure.

Preferably, the irradiation apparatus may further include a correction unit which corrects the rotation angle of the light deflecting mirror, based on the rotation angle of the light deflecting mirror, the rotation angle being detected by the angle detection unit.

With this exemplary structure, as the rotation angle of the light deflecting mirror can be corrected based on the detected rotation angle of the light deflecting mirror, it is possible to prevent displacement of the irradiation range, the displacement being caused when the rotation angle of the light deflecting mirror is displaced relative to the rotation angle for control.

Preferably, the first light source may radiate the first light which has a shorter wavelength than the wavelength of the second light, and the second light source may be disposed so as to be able to receive the first light and detect the light intensity of the first light source, based on the first light received.

With this exemplary structure, as the light intensity of the first light source can be detected by the second light source, which is used to detect the rotation angle of the light deflecting mirror, it is possible to readily detect the light intensity of the first light source without addition of a new component.

Preferably, the first light source may correct the light intensity of the first light source, based on the light intensity of the first light source, the light intensity being detected by the second light source.

With this exemplary structure, as the light intensity of the first light source is detected, and the light intensity of the first light source can be corrected based on the detected light intensity, it is possible to correct the light intensity of the first light source in the case that the light intensity of the first light source is weaker or stronger than a light intensity range that is set, so as to fall in the light intensity range set. This can prevent defective irradiation due to an inappropriate light intensity.

BRIEF DESCRIPTION OF THE DRAWINGS

FIG. 4 is a flowchart of a process of control for angle detection;

FIG. 5 is a diagram schematically illustrating an MEMS projector that detects a light intensity in a second embodiment; and FIG. 6 is a flowchart of a process of control for detection of a light intensity in the second embodiment.

DESCRIPTION OF THE PREFERRED EMBODIMENTS

First Embodiment

Figure 1:
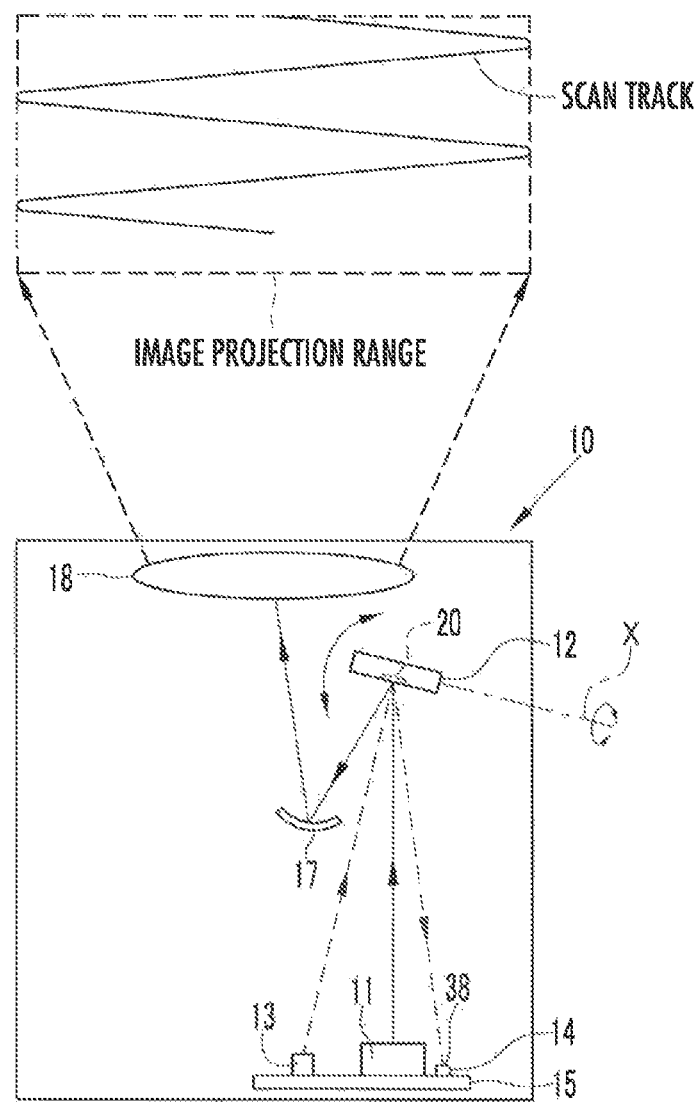
FIG. 1 is a diagram schematically illustrating an MEMS projector.

As illustrated in FIG. 1, an MEMS projector 10 (an irradiation apparatus) includes an irradiation light source 11 (a first light source) and a light deflector 12 that scans the light from the irradiation light source 11 in a two-dimensional manner (in the horizontal direction and the vertical direction). For example, the irradiation light source 11 includes laser diodes configured to radiate respective RGB laser beams and radiates a combined light of the RGB laser beams, using an optical component, for example.

The MEMS projector 10 includes an inspection light source 13 (a second light source) and a light receiver 14. The inspection light source 13 radiates a laser beam (an inspection light) toward a first support portion 22 of the light deflector 12, to be described later. The light receiver 14 receives the inspection light reflected on the first support portion 22.

In this embodiment, the inspection light source 13 radiates, for example, infrared radiation (near-infrared radiation having a wavelength between 0.7 and 2.5 μm) as an inspection light. As infrared radiation cannot be visually recognized by people, an inspection light radiated from the MEMS projector 10 to outside will not cause a problem.

The irradiation light source 11, the inspection light source 13, and the light receiver 14 are mounted on a circuit board 15.

The MEMS projector 10 includes a correction mirror 17 and a projection lens 18. The correction mirror 17 corrects distortion of the light scanned by the light deflector 12 (details to be described later). The projection lens 18 receives the light corrected by the correction mirror 17.

The irradiation light source 11 radiates a laser beam toward the center of a light deflecting mirror 20 of the light deflector 12.

The light scanned by the light deflector 12 enters the correction mirror 17. Note here that the light scanned by the light deflector 12 is distorted due to the influence of the incoming angle at which the light has entered the light deflecting mirror 20 and the rotation axis of the light deflecting mirror 20.

The correction mirror 17 corrects the distortion of the light scanned by the light deflector 12 and reflects the corrected light. The correction mirror 17 has a curved reflection surface.

Figure 2:
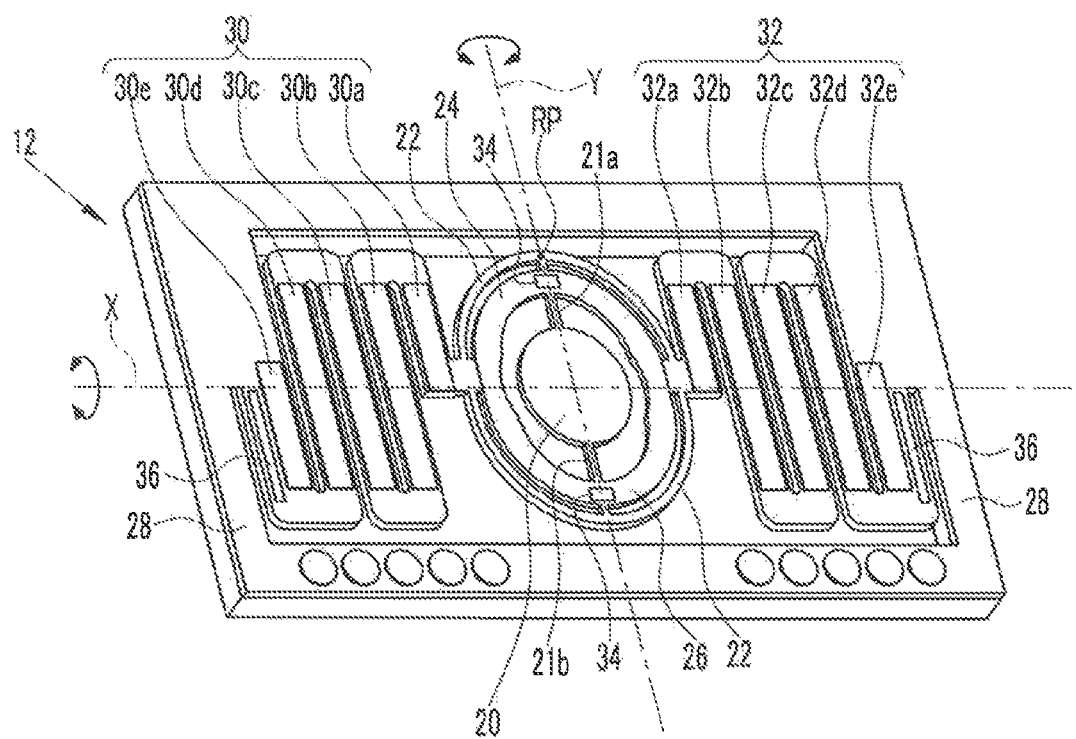
FIG. 2 is a perspective view of a light deflector.

As illustrated in FIG. 2, the light deflector 12 having the light deflecting mirror 20 has a first support portion 22 (a support portion) that supports the light deflecting mirror 20 having the reflection surface with a pair of torsion bars 21a, 21b.

The light deflector 12 has first actuators 24, 26 (a rotation portion) that cause the light deflecting mirror 20 to rotate around the pair of torsion bar 21a, 21b, that is, in a main scanning direction (around the Y axial line, around the second axial line) relative to the first support portion 22.

The light deflector 12 includes a second support portion 28 that supports the first support portion 22, and second actuators 30, 32 that cause the first support portion 22 to rotate in a sub-scanning direction (around the X axial line, around the first axial line) relative to the second support portion 28. As described above, the light deflector 12 is a biaxial light deflector capable of two-dimensional scanning.

As an actuator of the light deflector 12, a piezoelectric actuator, an electrostatic actuator, or an electromagnetic actuator can be used. In this embodiment, a piezoelectric actuator is employed as the first actuators 24, 26. Each of the second actuators 30, 32 has a structure including five piezoelectric cantilevers connected. Each of the piezoelectric cantilevers 30a to 30e, 32a to 32e has a laminated structure including a supporting body, a lower electrode, a piezoelectric body, and an upper electrode.

Projection of an image based on an image signal is implemented through high speed scanning in the horizontal direction and a low speed scanning in the vertical direction. For this purpose, the light deflecting mirror 20 rotates in the main scanning direction (around the Y axial line) with resonance drive by the first actuators 24, 26 adapted to high speed operation, and in the sub-scanning direction (around the X axial line) with non-resonance drive by the second actuators 30, 32 adapted to low speed operation. Note that an "image" in this embodiment includes an image expressed by means of the light intensity distributions of respective RGB light emissions or only light intensity distribution of white light emission.

For detection of the rotation state of the light deflecting mirror 20, the first actuators 24, 26 have first sensors 34 disposed adjacent to the torsion bars 21a, 21b, respectively.

The first sensors 34 detect the respective displacements of the first actuators 24, 26. The second actuators 30, 32 have second sensors 36 near the second support portion 28. The second sensors 36 detect the respective displacements of the second actuators 30, 32. As a position sensor, a sensor utilizing a piezoelectric effect or a sensor utilizing a piezo resistance effect can be employed. A sensor utilizing a piezoelectric effect operates as a speed sensor that returns a differential value relative to the amount of displacement in the swing angle of the light deflecting mirror 20. Meanwhile, a sensor utilizing a piezo resistance effect operates as a position sensor that returns a value proportional to the amount of displacement in the swing angle of the light deflecting mirror 20.

Use of an actuator and a sensor both utilizing a piezoelectric effect is preferred in that the laminated structure of the actuator and that of the sensor can be formed in the same manufacturing process.

As for each of the sensors 34, 36, at least one unit is necessary to be disposed. Specifically, line symmetrical disposition of two sensors relative to the Y axis at the middle, as illustrated in FIG. 2, is preferred for improvement in rotation stability of the light deflecting mirror 20 around the main scanning direction (around the Y axial line) and the sub-scanning direction (around the X axial line), respectively, and noise cancelling effect for differential signals.

The inspection light source 13 (refer to FIG. 1) radiates an inspection light toward the reflection position RP of the first support portion 22 of the light deflector 12. In this embodiment, the reflection position RP is defined at a position on the Y axial line of the light deflecting mirror 20 and more upward than the X axial line of the light deflecting mirror 20. The position of the reflection position RP is discretionally changeable provided that the position is not on the X axial line of the light deflecting mirror 20.

The light receiver 14 (refer to FIG. 1) receives the inspection light reflected at the reflection position RP of the first support portion 22 of the light deflector 12. The light receiver 14 has a shape extending in the depth direction in FIG. 1 so that the light receiver 14 can receive the inspection light even if the first support portion 22 (the light deflecting mirror 20) rotates around the X axial line by a maximum amount. In this embodiment, the light receiver 14 includes, for example, a one-dimensional photodiode array including a plurality of light receiving elements 38 aligned in the depth direction in FIG. 1 for detection of a position where the inspection light has been received.

If the first support portion 22 of the light deflector 12 rotates around the X axial line, the position where the inspection light is received in the light receiver 14 will change. The light receiver 14 detects the position where the inspection light has been received, based on which of the plurality of light receiving elements 38 has received the inspection light. The number of light receiving elements 38 is discretionally changeable.

Figure 3:
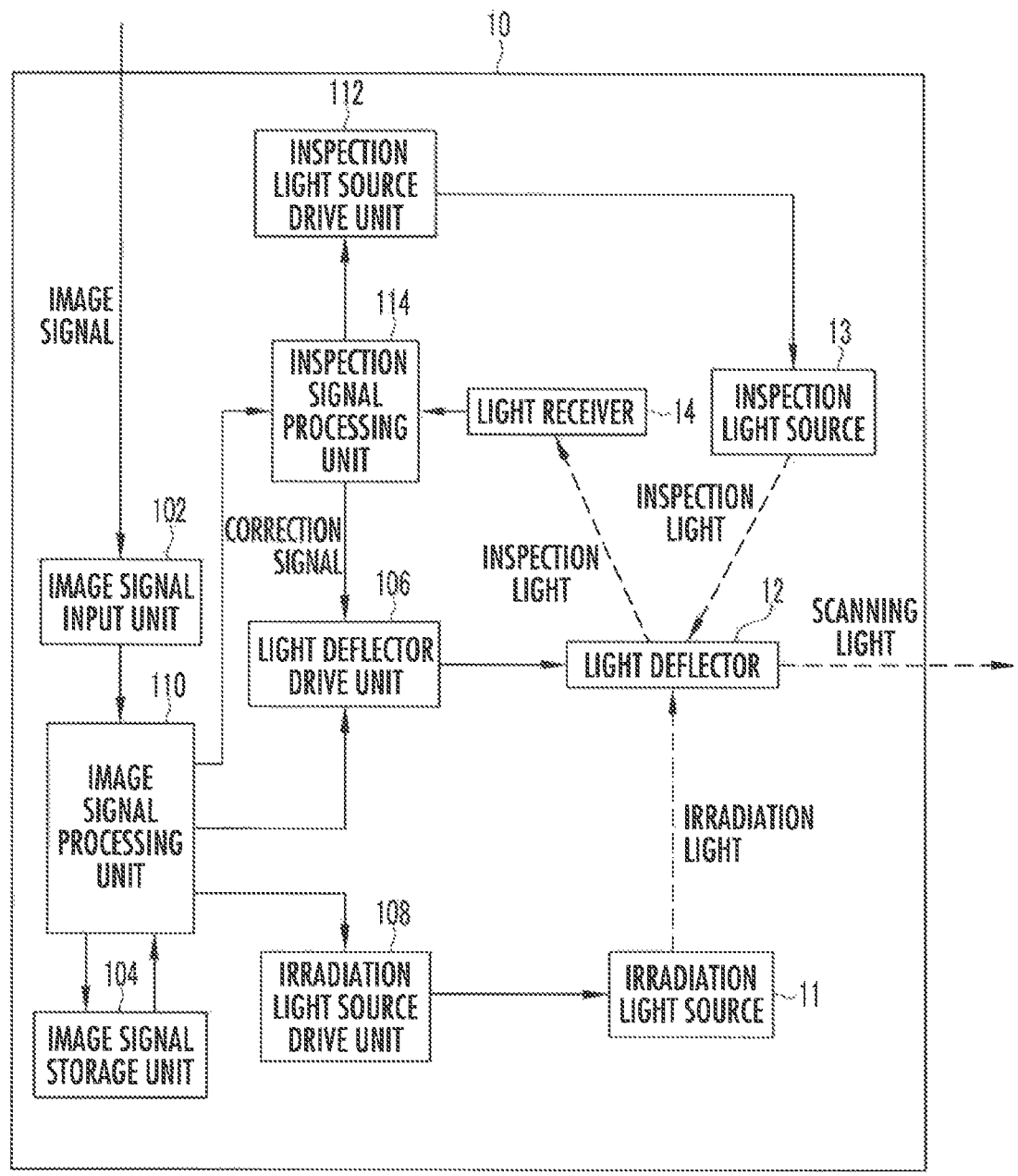
FIG. 3 is a block diagram illustrating the internal structure of an MEMS projector.

As illustrated in FIG. 3, the MEMS projector 10 includes an image signal input unit 102, an image signal storage unit 104, and a light deflector drive unit 106. The image signal input unit 102 receives an image signal outputted from an image source, such as, personal computers or camera systems. The image signal storage unit 104 is subjected to writing and reading for every predetermined bit to process the image signal received. The light deflector drive unit 106 outputs a drive signal to the light deflector 12.

The MEMS projector 10 further includes an irradiation light source drive unit 108 and an image signal processing unit 110. The irradiation light source drive unit 108 outputs pixel data to the irradiation light source 11. The image signal processing unit 110 processes an image signal to control the MEMS projector 10.

The MEMS projector 10 further includes an inspection light source drive unit 112 and an inspection signal processing unit 114 (an angle detection unit). The inspection light source drive unit 112 drives the inspection light source 13. The inspection signal processing unit 114 sends a drive signal toward the inspection light source drive unit 112.

To process the image signal, the image signal input unit 102 outputs the received image signal to the image signal processing unit 110. As the image signal input unit 102, an image signal receiver adapted to, for example, VGA (analogue RGB), DVI, HDMI (registered trademark), or Display Port, can be used.

To process the image signal outputted from the image signal input unit 102, the image signal storage unit 104 conducts writing and reading of the signal. As the image signal storage unit 104, SDRAMs, for example, are usable.

The light deflector drive unit 106 includes a D/A converter and an operational amplifier (both not illustrated). The D/A converter converts a digital signal from the image signal processing unit 110 into an analog signal to output a drive signal to the light deflector 12. The operational amplifier amplifies the output signal to the driving voltage level of the light deflector 12.

The irradiation light source drive unit 108 includes a high speed D/A converter and a driver transistor, or the like (both not illustrated). The high speed D/A converter converts the digital signal outputted from the image signal processing unit 110 into an analog signal. The driver transistor has a current capacity enough to drive the irradiation light source 11 for respective RGB colors.

The image signal processing unit 110 processes the image signal to control the MEMS projector 10. As the image signal processing unit 110, for example, Field-Programmable Gate Arrays (FPGA), microprocessors, or hybrid devices (Extensible Processing Platform (EPP)) of these, or Systems on Chip (SOC) can be used. As the image signal processing unit 110, for example, the image signal processing unit disclosed in detail in Japanese Unexamined Patent Application Publication No. 2018-049217 can be used.

[Scan]

When an image signal is inputted from outside to the image signal input unit 102, writing and reading for every predetermined bit of the image signal is conducted with respect to the image signal storage unit 104. The image signal processing unit 110 sends a drive signal to drive the light deflector 12 to the light deflector drive unit 106, and sends a drive signal to drive the irradiation light source 11 to the irradiation light source drive unit 108.

Based on the drive signal received, the light deflector drive unit 106 drives the light deflector 12, that is, rotates the light deflecting mirror 20.

Based on the drive signal received, the irradiation light source drive unit 108 drives the irradiation light source 11 to have the irradiation light source 11 radiate light.

As illustrated in FIG. 1, the light radiated from the irradiation light source 11 is reflected by the light deflector 12, then subjected to distortion correction by the correction mirror 17, and reflected. The light further passes through the projection lens 18 and draws an image (a scan track) in an image projection range. For image drawing, vertical scanning in the image projection range in FIG. 1 is achieved by the light deflecting mirror 20 rotating in the sub-scanning direction (around the X axial line), and horizontal scanning in the image projection range in FIG. 1 is achieved by the light deflecting mirror 20 rotating in the main scanning direction (around the Y axial line).

As the light deflecting mirror 20 is driven at a low speed when rotating in the sub-scanning direction, either of a resonance drive actuator and a non-resonance drive actuator is usable. In this embodiment, a non-resonance drive actuator is used. In this case, as described in detail in Japanese Unexamined Patent Application Publication No. 2018-049217, a drive signal having a saw-tooth waveform, which is preferable for non-resonance drive actuators, is used to prolong the effective drawing time, whereby brightness in the image projection range can be improved.

[Detection and Correction of Angle of Light Deflecting Mirror]

Control for detection and correction of the rotation angle of the light deflecting mirror 20 of the light deflector 12 will now be described referring to the flowchart in FIG. 4.

Initially, the image signal processing unit 110 executes a normal operation of drawing an image (a scan track) in an image projection range (STEP 1). In this state, the image signal processing unit 110 outputs an inspection signal toward the inspection signal processing unit 114 for every predetermined period of time (for example, ten seconds) (STEP 2). Note that the inspection signal contains a rotation angle information on rotation of the light deflecting mirror 20 around the X axial line for control at the time.

Having received the inspection signal, the inspection signal processing unit 114 outputs a light emission instruction signal toward the inspection light source drive unit 112 (STEP 3). Having received the light emission instruction signal, the inspection light source drive unit 112 outputs a light emission signal toward the inspection light source 13 (STEP 4). The inspection light source 13 radiates an inspection light toward the reflection position RP of the first support portion 22 of the light deflector 12 (STEP5).

The inspection light radiated toward the reflection position RP of the first support portion 22 is reflected at the reflection position RP of the first support portion 22.

Thereafter, when the inspection light having been reflected at the reflection position RP of the first support portion 22 of the light deflector 12 is received by the light receiver 14 (STEP 6), the light receiver 14 outputs a received light signal in accordance with the light receiving position at which the inspection light has been received toward the inspection signal processing unit 114 (STEP 7).

A detection method for detecting a light receiving position where the inspection light has been received is as described below. Specifically, the light receiver 14, which includes a plurality of light receiving elements 38 in one-dimensional array, detects a light receiving position at which the inspection light has been received, based on which of the plurality of light receiving elements 38 has received the inspection light. Each of the plurality of light receiving elements 38 is capable of detecting the intensity of the light received. In the case that the light is received by two or more light receiving elements 38, it is determined that the light receiving element 38 which has received the inspection light having a maximum intensity has received the inspection light.

In this embodiment, in the case that the first support portion 22 rotates to thereby rotate the light deflecting mirror 20 in the sub-scanning direction (around the X axial line), the reflection direction of the inspection light reflected at the reflection position RP of the first support portion 22 will change. Thus, the reflection direction (a reflection angle) of the inspection light can be detected, based on the position where the inspection light has been received. Further, as the reflection direction of the inspection light changes in conjunction with the rotation angle of the light deflecting mirror 20 around the X axial line, the rotation angle of the light deflecting mirror 20 around the X axial line can be detected based on the inspection light received.

Based on the received light signal inputted, the inspection signal processing unit 114 detects the rotation angle of the light deflecting mirror 20 of the light deflector 12 around the X axial line, and further calculates the amount of displacement (an angle) of the light deflecting mirror 20 of the light deflector 12 around the X axial line through predetermined calculation processing. Then, the inspection signal processing unit 114 outputs a correction signal in accordance with the calculated amount of displacement toward the light deflector drive unit 106 (STEP 8).

As a method for calculating the amount of displacement, for example, a light receiving position in the light receiver 14 when the light deflecting mirror 20 with no displacement around the X axial line is used with no voltage applied to the piezoelectric actuator (held at a mechanical origin with inherent elastic force of the material) is measured in advance as a threshold, and the difference between the threshold and an actual light receiving position is calculated to thereby calculate the amount of displacement. The above-mentioned threshold is measured in advance at a plurality of rotation positions (for example, for every) 0.1° of the light deflecting mirror 20. The inspection signal processing unit 114 calculates the amount of displacement, based on the rotation angle of the light deflecting mirror 20 around the X axial line at the time of inspection, the rotation angle being contained in the inspection signal.

For example, in the case that the rotation angle of the light deflecting mirror 20 around the X axial line is 1° for control and the actual rotation angle of the light deflecting mirror 20 around the X axial line is 3°, the amount of displacement calculated at STEP 8 is 2°.

Based on the correction signal inputted, the light deflector drive unit 106 corrects the rotation angle of the light deflecting mirror 20 of the light deflector 12 around the X axial line (STEP 9). For example, with an input of a correction signal in accordance with the amount of displacement of 2°, as mentioned above, the light deflector drive unit 106 corrects the rotation angle of the light deflecting mirror 20 of the light deflector 12 around the X axial line by 2°. Note that the process from STEP 2 to STEP 9 is executed, for example, in a period of about 30 µsec.

In the case that the light deflecting mirror 20 of the light deflector 12 is displaced around the X axial line, it may not be possible to scan a desired range with the laser beam radiated from the irradiation light source 11 in some cases.

In this embodiment, execution of the above-mentioned STEP 9 enables correction of the displacement of the light deflecting mirror 20 of the light deflector 12 around the X axial line, so that a desired range can be scanned with the laser beam radiated from the irradiation light source 11.

After outputting the correction signal toward the light deflector drive unit 106 (STEP 8), the inspection signal processing unit 114 outputs an end signal toward the image signal processing unit 110 (STEP 10).

Upon receipt of the end signal, the image signal processing unit 110 stops outputting the inspection signal, and returns to the normal operation (STEP 11).

In the first embodiment, based on the light receiving position where the inspection light having been reflected at the reflection position RP of the first support portion 22 of the light deflector 12 is received by the light receiver 14, the reflection direction (a reflection angle) of the inspection light is detected, and the rotation angle of the light deflecting mirror 20 around the X axial line is detected. Then, the amount of displacement (an angle) of the light deflecting mirror 20 around the X axial line is calculated, and the rotation angle of the light deflecting mirror 20 around the X axial line is corrected based on the calculated amount of displacement. With the above, the MEMS projector 10 can prevent displacement in the irradiation range, the displacement being caused when the rotation angle of the light deflecting mirror 20 is displaced relative to the rotation angle for control.

Second Embodiment

FIG. 5 and FIG. 6 illustrates an MEMS projector 200 in a second embodiment. The MEMS projector 200 includes irradiation light sources 11A, 11B, light deflectors 12A, 12B, light receivers 14A, 14B, correction mirrors 17A, 17B, and light deflecting mirrors 20A, 20B. The structures of the irradiation light sources 11A, 11B, the light deflectors 12A, 12B, the light receivers 14A, 14B, the correction mirrors 17A, 17B, and the light deflecting mirrors 20A, 20B are similar to those of the irradiation light source 11, the light deflector 12, the light receiver 14, the correction mirror 17, and the light deflecting mirror 20 in the first embodiment, respectively, and these components are disposed symmetrical. A structural component similar to one in the above-described first embodiment is given the same reference sign, and a detailed description of the component is omitted.

In the MEMS projector 200, the light deflecting mirror 20A rotates in the sub-scanning direction (around the XA axial line) with non-resonance drive by the second actuators 30, 32 of the light deflector 12A, while the light deflecting mirror 20B rotates in the sub-scanning direction (around the XB axial line) with non-resonance drive by the second actuators 30, 32 of the light deflector 12B.

The MEMS projector 200 has a prism 202 that splits an incident light. In this embodiment, the inspection light source 13 (a second light source) radiates a laser beam (an inspection light) toward the prism 202. The prism 202 splits the inspection light radiated from the inspection light source 13 such that the split light beams proceed toward the reflection position RP of the first support portion 22 of the left light deflector 12A (refer to FIG. 2) and toward the reflection position RP of the first support portion 22 of the right light deflector 12B, respectively.

[Scan]

In the second embodiment, similar to the above-described first embodiment, when an image signal is inputted from outside to the image signal input unit 102, writing and reading for every predetermined bit of the image signal is conducted with respect to the image signal storage unit 104. The image signal processing unit 110 sends a drive signal to the light deflector drive unit 106 to drive the light deflectors 12A, 12B, and sends a drive signal to the irradiation light source drive unit 108 to drive the irradiation light sources 11A, 11B. Note that an "image" in this embodiment includes an image expressed by means of the light intensity distributions of respective RGB light emissions or only light intensity distribution of white light emission.

Based on the received drive signal, the light deflector drive unit 106 drives the light deflectors 12A, 12B, that is, rotates the light deflecting mirrors 20A, 20B.

Based on the received drive signal, the irradiation light source drive unit 108 drives the irradiation light sources 11A, 11B to have the irradiation light sources 11A, 11B radiate light.

As illustrated in FIG. 5, the light radiated from the irradiation light source 11A is reflected by the light deflecting mirror 20A of the light deflector 12A, then subjected to distortion correction by the correction mirror 17A, and reflected. The light further passes through the projection lens 18 and draws a first image (a first scan track) in a first image projection range PR1.

Meanwhile, the light radiated from the irradiation light source 11B is reflected by the light deflecting mirror 20B of the light deflector 12B, then subjected to distortion correction by the correction mirror 17B, and reflected. The light further passes through the projection lens 18 and draws a second image (a second scan track) in a second image projection range PR2.

In the second embodiment, the second image projection range PR2 relevant to the light deflector 12B overlies the first image projection range PR1 relevant to the light deflector 12A. Specifically, the second image projection range PR2 is larger than the first image projection range PR1, and the second image projection range PR2 overlies the first image projection range PR1 such that the first image projection range PR1 is formed at the middle of the second image projection range PR2 as a horizontally long area. The brightness of the overlying area is higher than that of other areas. Note that the dimensions of the first image projection range PR1 and the second image projection range PR2 are discretionally changeable. The overlying range as well is discretionally changeable. For example, the second image projection range PR2 may be smaller than the first image projection range PR1, or a part of the first image projection range PR1 may overlap a part of the second image projection range PR2.

[Detection and Correction of Light Intensity]

Control for detection and correction of the respective light intensities of the irradiation light sources 11A, 11B in the MEMS projector 200 will now be described referring to the flowchart in FIG. 6.

Initially, the image signal processing unit 110 executes a normal operation of drawing an image (a scan track) in an image projection range (STEP 21). In this state, the image signal processing unit 110 outputs a detection signal toward the irradiation light source drive unit 108 for every predetermined period of time (for example, two hours) (STEP 22). In the above, the inspection light source 13 remains tuned off.

With the detection signal inputted, the irradiation light source drive unit 108 outputs a turn-off signal to an irradiation light source that is not a target of detection, or a non-detection target, of the irradiation light sources 11A, 11B, namely, the irradiation light source 11B here, for example (STEP 23). Upon receipt of the turn-off signal, the irradiation light source 11B, or the non-detection target, is turned off (STEP 24).

Simultaneously with the output of the turn-off signal, the irradiation light source drive unit 108 outputs a light emission signal toward the irradiation light source 11A, or a detection target (STEP 25). Upon receipt of the light emission signal, the irradiation light source 11A, or the detection target, emits light (radiates light) (STEP 26). In this state, only the irradiation light source 11A, or the detection target, is emitting light. In the case that the irradiation light source 11A, or the detection target, receives a light emission signal while emitting light, the irradiation light source 11A continues the light emission.

In this embodiment, to scan the upper part of the first image projection range PR1 and the second image projection range PR2, the irradiation light source drive unit 108 outputs the light emission signal toward one of the irradiation light sources 11A, 11B, the one being a detection target (STEP 25). Thus, in scanning the upper part of either one of the first image projection range PR1 and the second image projection range PR2, one of the irradiation light sources 11A, 11B, the one being a non-detection target, remains turned off. A part corresponding to the turn-off is a part in the first image projection range PR1 and the second image projection range PR2, the part being less influential even if the irradiation light source is turned off.

In the MEMS projector 200, the light radiated from the irradiation light sources 11A, 11B is repetitively reflected and scattered inside the MEMS projector 200 to be formed into a scattered light, which enters the inspection light source 13. Note that a diffusion panel (not illustrated) may be disposed between the correction mirrors 17A, 17B and the projection lens 18 when necessary so that the light radiated from the irradiation light sources 11A, 11B can more efficiently enter the inspection light source 13.

The inspection light source 13 radiates infrared radiation (near-infrared radiation of 0.7 to 2.5 μm) and has a capability of receiving light (RGB, for example, respective irradiation light beams, such as, red light at 700.0 nm, green light at 550 nm, and blue light at 450 nm) radiated from the irradiation light sources 11A, 11B, the light having a shorter wavelength than that of the infrared radiation radiated from the inspection light source 13. In detail, receipt of light in red, green, or blue causes a photoelectric current to flow. With the photoelectric current flowing, the inspection light source 13 has received the light.

Having received the light radiated from the irradiation light source 11A, or the detection target (STEP 27), the inspection light source 13 outputs a received light signal containing the received light intensity information toward the irradiation light source drive unit 108 (STEP 28).

Upon receipt of the received light signal, the irradiation light source drive unit 108 determines whether the light intensity information contained in the received light signal is outside a predetermined light intensity range (whether correction is necessary) (STEP 29). When it is determined that the light intensity information is outside the predetermined light intensity range ("YES" at STEP 29), the irradiation light source drive unit 108 outputs a correction signal to the irradiation light source 11A, or the detection target (STEP 30).

Upon receipt of the correction signal, the irradiation light source 11A, or the detection target, corrects the light intensity to emit light (STEP 31).

Meanwhile, when the light intensity information contained in the received light signal is determined not outside the predetermined light intensity range ("NO" at STEP 29) and after a correction signal is outputted to the irradiation light source 11A, or the detection target (STEP 30), the irradiation light source drive unit 108 outputs an end signal to the image signal processing unit 110 (STEP 32).

Upon receipt of the end signal, the image signal processing unit 110 outputs a light emission instruction signal toward the irradiation light source drive unit 108 (STEP 33).

Upon receipt of the light emission instruction signal, the irradiation light source drive unit 108 outputs a light emission signal toward the irradiation light source 11B, or the non-detection target (STEP 34).

Upon receipt of the light emission signal, the irradiation light source 11B, or the non-detection target, emits light (STEP 35). With the above, both the irradiation light sources 11A and 11B emit light.

After outputting the light emission instruction signal toward the irradiation light source drive unit 108 (STEP 33), the image signal processing unit 110 stops outputting the detection signal, and returns to the normal operation (STEP 36).

The above-described STEPs 21 to 36 are repetitively executed while changing the detection target between the irradiation light sources 11A and 11B. This enables detection and correction of the respective light intensities of the irradiation light sources 11A, 11B. Note that the control for light intensity detection and correction in the second embodiment may be implemented with the structure in the first embodiment.

In the MEMS projector 200 in the second embodiment as well, similar to the above-described first embodiment, control for detection and correction of the rotation angle of the light deflecting mirror 20 of the light deflector 12 is executed.

In the MEMS projector 200, the light deflectors 12A, 12B are provided to sequentially execute control for detection and correction of the rotation angles of the light deflecting mirrors 20A, 20B. In this case, the irradiation light sources 11A, 11B are controlled for turn-on and turn-off so as to radiate light to one of the light deflectors 12A, 12B, the one being the control target, and so as not to radiate light to the other that is not a control target. Then, control for detection and correction of the angle of the light deflecting mirror, similar to the first embodiment, is executed with respect to one of the light deflectors 12A, 12B, the one being the control target.

While changing the control target between the light deflectors 12A and 12B, control for detection and correction of the angle of the light deflecting mirror is executed, similar to the above-described first embodiment. Note that although the irradiation light sources 11A, 11B, the light deflectors 12A, 12B, the light receivers 14A, 14B, the correction mirrors 17A, 17B, and the light deflecting mirrors 20A, 20B are provided in the second embodiment, the number of these components are discretionally changeable. That is, provision of one for each component is acceptable. In the case that three or more units are provided for each component, the control for detection and correction of the angle of the light deflecting mirrors is sequentially executed.

Although detection and correction of the rotation angle of the light deflecting mirror 20 is executed in the above-described first embodiment, correction of the rotation angle of the light deflecting mirror 20 may not be executed.

Although the rotation angle of the light deflecting mirror 20 is detected, based on which of the plurality of light receiving elements 38 of the light receiver 14 has received the inspection light in the above-described first embodiment, the light intensity distribution of the inspection light received by the plurality of light receiving elements 38 of the light receiver 14 may be detected, and the rotation angle of the light deflecting mirror 20 may be detected based on the light intensity distribution of the inspection light detected.

Although the light intensities of the irradiation light sources 11A, 11B are detected and corrected in the above-described second embodiment, light intensity correction may not be executed.

Although the prism 202 is provided to split the inspection light such that the inspection light beams split by the prism 202 proceed toward the respective reflection positions RP of the first support portions 22 in the above-described second embodiment, the prism 202 may not be provided and the inspection light source 13 may radiate light directly toward the respective reflection positions RP of the first support portions 22 of the light deflectors 12A, 12B.

Although the irradiation light source 11 (the irradiation light sources 11A, 11B) includes laser diodes configured to radiate respective RGB laser beams and radiates a combined light of these laser beams, using an optical component, in the above-described first embodiment and second embodiment, this is not an exclusive example. For example, a laser diode configured to radiate a laser beam in the blue region (for example, a wavelength of 450 nm) may constitute the irradiation light source 11 (the irradiation light sources 11A, 11B). In this case, a fluorescent member that receives the laser beam in the blue region reflected by the correction mirror 17 (the correction mirrors 17A, 17B) is provided between the correction mirror 17 (the correction mirrors 17A, 17B) and the projection lens 18. The fluorescent member receives the laser beam in the blue region subjected to correction by the correction mirror 17 (the correction mirrors 17A, 17B), and converts at least a part of the laser beam into light having a different wavelength. For the fluorescent member, for example, any member that is excited by a laser beam in the blue region to emit yellow light is used. With the above, the fluorescent member radiates white light (pseudo white light) that is a result of blending of the laser beam in the blue region that is transmitting (passing) through the fluorescent member and emitted light (yellow light) due to the laser beam in the blue region. Note that in the case that the above-mentioned fluorescent member is provided, the fluorescent member may be used as a diffusion panel in executing control for detection and correction of the light intensity in the second embodiment.

As the irradiation light source 11 (the irradiation light sources 11A, 11B), for example, a laser diode that radiates a near-ultraviolet laser beam may be used. In this case, a material that is excited by a near-ultraviolet laser beam to emit light in three colors, namely, red, green, and blue, is used as a fluorescent member.

Although the correction mirror 17 (the correction mirrors 17A, 17B) and the projection lens 18 are provided in the above-described first embodiment and second embodiment, these are not indispensable elements. The correction mirror 17 (the correction mirrors 17A, 17B) and/or the projection lens 18 is omissible in some arrangements of the respective components.

Although the present invention is applied to an MEMS projector in the above-described first embodiment and second embodiment, this is not an exclusive example. The present invention can be applied to, for example, vehicle lights for use as vehicle headlights. For vehicle lights, as described in detail in Japanese Unexamined Patent Application Publication No. 2015-184591, light distribution pattern data is inputted from a vehicle, and lighting control of the irradiation light source 11 and drive control of the light deflector 12 are executed based on the light distribution pattern data.

REFERENCE SIGN LIST 10, 200 . . . MEMS projector (irradiation apparatus), 11, 11A, 11B . . . irradiation light source (first light source), 12, 12A, 12B . . . light deflector, 13 . . . inspection light source (second light source), 14, 14A, 14b . . . light receiver, 20, 20A, 20B . . . light deflecting mirror, 22 . . . first support portion (support portion), 24, 26 . . . first actuator (rotation portion), 38 . . . light receiving element, 106 . . . light deflector drive unit (correction unit), 114 . . . inspection signal processing unit (angle detection unit).

What is claimed is:

1. An irradiation apparatus, comprising:
a first light source which radiates a first light;
a light deflector including a light deflecting mirror which reflects the first light radiated from the first light source, a support portion which supports the light deflecting mirror and is rotatable around a first axial line, and a rotation portion which rotates the light deflecting mirror around a second axial line which is orthogonal to the first axial line, the light deflector being configured to scan the first light by changing a reflection direction of the first light into which the first light is reflected by the light deflecting mirror, the reflection direction being changed by rotating the support portion to thereby rotate the light deflecting mirror around the first axial line and also by rotating the light deflecting mirror around the second axial line by the rotation portion;
a second light source which radiates a second light;
a light receiver which receives the second light radiated from the second light source and reflected by the support portion of the light deflector;
an angle detection unit which detects a rotation angle of the light deflecting mirror around the first axial line, based on the second light received by the light receiver; and
a pair of torsion bars connect the support portion and the light deflecting mirror,
the support portion configured to support the light deflecting mirror via the pair of torsion bars, such that the first light is directed to the center of the light deflecting mirror, and the second light is directed to a reflection position on the support portion, the reflection position being spaced from and not on the first axial line, such that the second light reflects at the reflection position.

2. The irradiation apparatus according to claim 1, wherein the light receiver includes a plurality of light receiving elements disposed in an array, the light receiver being configured to detect a reflection angle of the second light, based on which of the plurality of light receiving elements has received the second light, and
the angle detection unit detects the rotation angle of the light deflecting mirror, based on the reflection angle of the second light, the reflection angle being detected by the light receiver.

3. The irradiation apparatus according to claim 1, wherein the light receiver detects a light intensity distribution of the second light received, and
the angle detection unit detects the rotation angle of the light deflecting mirror, based on the light intensity distribution of the second light, the light intensity distribution being detected by the light receiver.

4. The irradiation apparatus according to claim 1, further comprising a correction unit which corrects the rotation angle of the light deflecting mirror, based on the rotation angle of the light deflecting mirror, the rotation angle being detected by the angle detection unit.

5. The irradiation apparatus according to claim 1, wherein the first light source radiates the first light which has a shorter wavelength than a wavelength of the second light, and
the second light source is disposed so as to be able to receive the first light and detects a light intensity of the first light source, based on the first light received.

6. The irradiation apparatus according to claim 5, wherein the first light source corrects the light intensity of the first light source, based on the light intensity of the first light source, the light intensity being detected by the second light source.

7. The irradiation apparatus according to claim 1, further comprising:
a light deflector drive unit which outputs a drive signal to the light deflector, the light deflector drive unit configured to rotate the mirror around the first axial line and the second axial line corresponding to a main scanning direction and a sub-scanning direction, respectively, wherein
scan speed in the main scanning direction is higher than scan speed in the sub-scanning direction.

8. The irradiation apparatus according to claim 7, wherein the reflection position of the support portion is on the second axial line.

9. The irradiation apparatus according to claim 7, wherein the light deflector further comprises:
a first actuator configured to drive the light deflecting mirror in the main scanning direction; and
a second actuator configured to drive the light deflecting mirror in the main sub-scanning direction.

10. The irradiation apparatus according to claim 9, wherein
the light deflector further comprises at least one of a first sensor configured to detect displacement of the first actuator and a second sensor configured to detect displacement of the second actuator.

11. The irradiation apparatus according to claim 10, wherein
the first sensor is comprised of two sensors symmetric about the first axial line,
the second sensor is comprised of two other sensors symmetric about the second axial line.

12. The irradiation apparatus according to claim 9, wherein the reflection position of the support portion is on the second axial line.

13. The irradiation apparatus according to claim 7, wherein
the light receiver includes a plurality of light receiving elements disposed in an array, the light receiver being configured to detect a reflection angle of the second light, based on which of the plurality of light receiving elements has received the second light, and
the angle detection unit detects the rotation angle of the light deflecting mirror, based on the reflection angle of the second light, the reflection angle being detected by the light receiver.

14. The irradiation apparatus according to claim 7, wherein
the light receiver detects a light intensity distribution of the second light received, and
the angle detection unit detects the rotation angle of the light deflecting mirror, based on the light intensity distribution of the second light, the light intensity distribution being detected by the light receiver.

15. The irradiation apparatus according to claim 7, further comprising a correction unit which corrects the rotation angle of the light deflecting mirror, based on the rotation angle of the light deflecting mirror, the rotation angle being detected by the angle detection unit.

16. The irradiation apparatus according to claim 15, wherein the reflection position of the support portion is on the second axial line.

17. The irradiation apparatus according to claim 15, wherein
the light deflector further comprises:
a first actuator configured to drive the light deflecting mirror in the main scanning direction; and
a second actuator configured to drive the light deflecting mirror in the main sub-scanning direction.

18. The irradiation apparatus according to claim 7, wherein the second light source is configured to emit infrared radiation.

19. The irradiation apparatus according to claim 15, wherein the second light source is configured to emit infrared radiation.

20. The irradiation apparatus according to claim 7, wherein
the irradiation apparatus further comprises a circuit board on which the first light source, the second light source and the light receiver are mounted.

* * * * *